(12) United States Patent
Legner et al.

(10) Patent No.: US 10,632,990 B2
(45) Date of Patent: Apr. 28, 2020

(54) DRIVE TRAIN OF A MOBILE VEHICLE

(71) Applicant: ZF Friedrichshafen AG, Friedrichshafen (DE)

(72) Inventors: Jürgen Legner, Friedrichshafen (DE); Wolfgang Rebholz, Sauldorf-Krumbach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 74 days.

(21) Appl. No.: 15/751,539

(22) PCT Filed: Jul. 7, 2016

(86) PCT No.: PCT/EP2016/066126
§ 371 (c)(1),
(2) Date: Feb. 9, 2018

(87) PCT Pub. No.: WO2017/029026
PCT Pub. Date: Feb. 23, 2017

(65) Prior Publication Data
US 2018/0229717 A1    Aug. 16, 2018

(30) Foreign Application Priority Data
Aug. 19, 2015 (DE) .......................... 10 2015 215 818

(51) Int. Cl.
*B60W 20/40* (2016.01)
*B60K 6/12* (2006.01)
(Continued)

(52) U.S. Cl.
CPC ............... *B60W 20/40* (2013.01); *B60K 6/12* (2013.01); *B60K 6/48* (2013.01); *B60K 6/54* (2013.01);
(Continued)

(58) Field of Classification Search
CPC ...... B60W 20/40; B60W 10/08; B60W 20/00; B60W 2510/0638; B60W 2710/08
See application file for complete search history.

(56) References Cited

U.S. PATENT DOCUMENTS

| 5,928,301 A | 7/1999 | Soga et al. |
| 6,921,984 B2 | 7/2005 | Rogg |

(Continued)

FOREIGN PATENT DOCUMENTS

| DE | 10 2006 017 581 A1 | 4/1973 |
| DE | 696 16 738 T2 | 8/2002 |

(Continued)

OTHER PUBLICATIONS

Achten et al., "Emissionsarmer Hydraulik-Hybridantrieb für Personenwagen" ATZ—Automobiltechnische Zeitschrift, May 2009, vol. 111, Issue 5, pp. 378-387.

(Continued)

*Primary Examiner* — Stacey A Fluhart
(74) *Attorney, Agent, or Firm* — Davis & Bujold PLLC; Michael J. Bujold

(57) ABSTRACT

A drive-train has an internal combustion engine (1) with an exhaust gas turbocharger, which drives a vehicle wheel (3) by way of a power-branching transmission (2). When there is an increase of the power demanded from the combustion engine (1) but the exhaust gas turbocharger is not yet producing the required charging pressure, an additional motor (4) is always switched into the drive-train in order to deliver torque to the drive-train.

7 Claims, 1 Drawing Sheet

(51) Int. Cl.
  *B60K 6/48*    (2007.10)
  *B60K 6/543*   (2007.10)
  *B60W 10/08*   (2006.01)
  *B60W 20/00*   (2016.01)
  *B60K 6/54*    (2007.10)
  *B60K 6/547*   (2007.10)

(52) U.S. Cl.
  CPC ............. *B60K 6/543* (2013.01); *B60K 6/547* (2013.01); *B60W 10/08* (2013.01); *B60W 20/00* (2013.01); B60W 2510/0638 (2013.01); B60W 2510/0657 (2013.01); B60W 2710/081 (2013.01); B60W 2710/09 (2013.01); B60Y 2200/92 (2013.01); B60Y 2300/18125 (2013.01); Y02T 10/6208 (2013.01); Y02T 10/6282 (2013.01); Y10S 903/903 (2013.01); Y10S 903/918 (2013.01)

(56) References Cited

U.S. PATENT DOCUMENTS

| | | | |
|---|---|---|---|
| 8,382,625 | B2 | 2/2013 | Legner |
| 2010/0192576 | A1* | 8/2010 | Legner ................. F16H 61/421 60/716 |
| 2010/0236348 | A1 | 9/2010 | Legner |
| 2010/0240483 | A1 | 9/2010 | Legner |
| 2011/0087390 | A1* | 4/2011 | Pandit ...................... B60K 1/00 701/22 |
| 2016/0046278 | A1* | 2/2016 | Matsuzaki .............. B60L 58/13 701/22 |
| 2016/0160470 | A1 | 6/2016 | Kishimoto et al. |
| 2018/0087241 | A1* | 3/2018 | Hoshino ................. B60L 50/15 |
| 2018/0171823 | A1* | 6/2018 | Yoshida ................. F01D 25/04 |

FOREIGN PATENT DOCUMENTS

| | | |
|---|---|---|
| DE | 103 40 472 A1 | 6/2005 |
| DE | 10 2009 001 602 A1 | 9/2010 |
| EP | 1 894 805 A2 | 3/2008 |
| EP | 2 899 082 A1 | 7/2015 |
| FR | 2 985 705 A1 | 7/2013 |
| GB | 2 455 177 A | 6/2009 |
| WO | 2015/111549 A1 | 7/2015 |

OTHER PUBLICATIONS

German Search Report Corresponding to 10 2015 215 818.7 dated Jul. 5, 2016.
International Search Report Corresponding to PCT/EP2016/066126 dated Sep. 28, 2016.
Written Opinion Corresponding to PCT/EP2016/066126 dated Sep. 28, 2016.

* cited by examiner

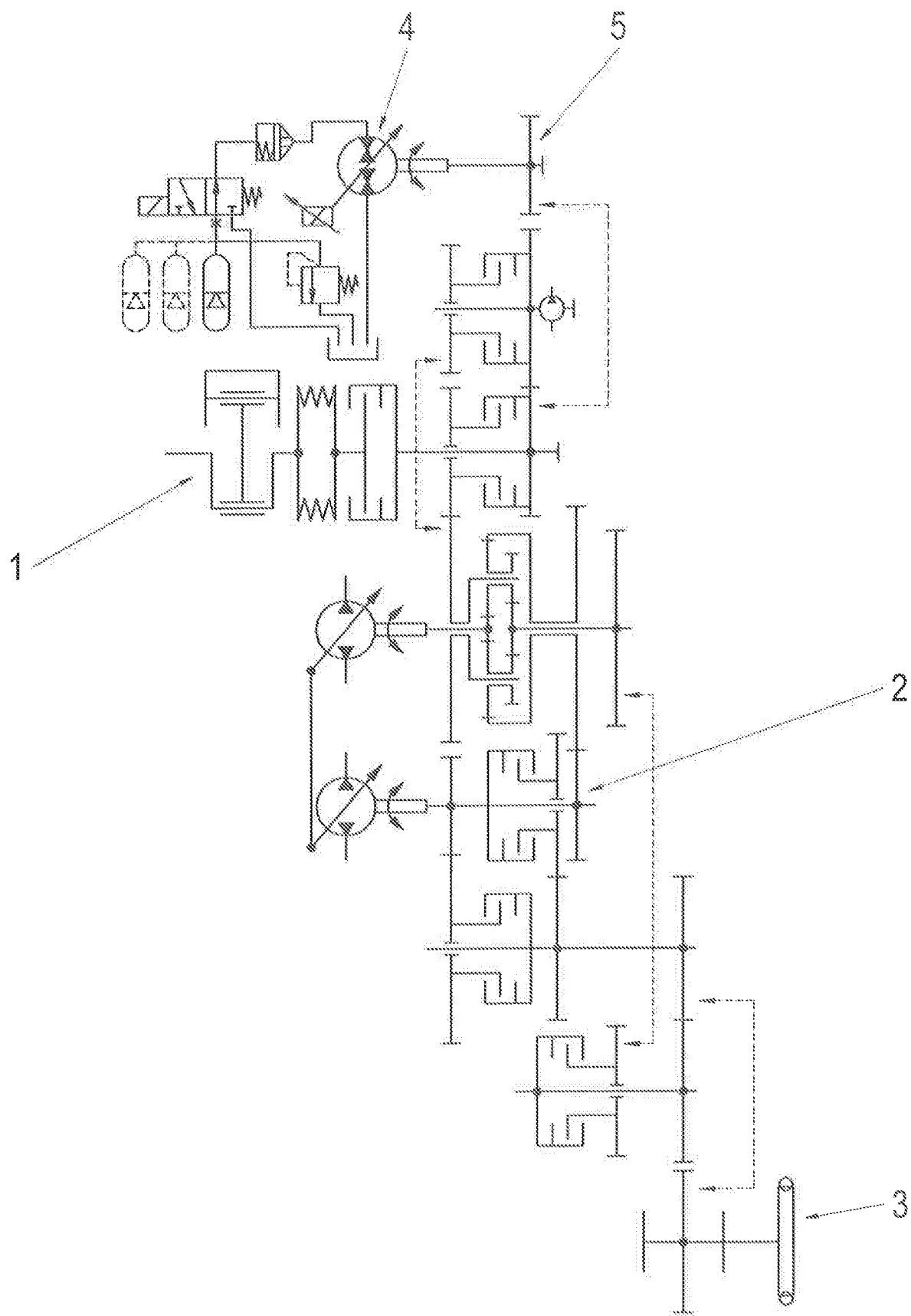

DRIVE TRAIN OF A MOBILE VEHICLE

This application is a National Stage completion of PCT/EP2016/066126 filed Jul. 7, 2016, which claims priority from German patent application serial no. 10 2015 215 818.7 filed Aug. 19, 2015.

FIELD OF THE INVENTION

The invention concerns a drive-train for a mobile vehicle.

BACKGROUND OF THE INVENTION

DE 102009001602A1 discloses a drive-train of the said type for a mobile vehicle, in which an internal combustion engine powers a drive output by way of a hydrostatic-mechanical, power-branching transmission. In addition, the internal combustion engine is functionally connected to a hydraulic motor that can also be operated as a pump. When the hydraulic motor is used as a pump, hydraulic pressure can be stored in a reservoir. If hydraulic pressure is needed for driving the hydraulic motor, then the hydraulic pressure can be supplied from the reservoir to the hydraulic motor, whereby this power is delivered to the drive-train.

SUMMARY OF THE INVENTION

The purpose of the present invention is to provide a drive-train for a mobile vehicle, in which the additional motor in the drive-train can be used in a working machine to the best possible effect.

This objective is achieved with a drive-train of a mobile vehicle which also incorporates the characterizing features specified in the principal claim.

The present invention is based on the recognition that, as a consequence of compliance with legislation regarding exhaust gases, internal combustion engines, in particular diesel engines with an exhaust gas turbocharger, are not supplied with the necessary fuel injection quantity when a power demand is increased, but rather, during the run-up time of the turbocharger this is reduced so as not to increase exhaust gas emissions to an unacceptable extent. Only when the exhaust gas turbocharger is operating at full power and has the corresponding rotational speed, is sufficient charging pressure available so that the necessary quantity of fuel can be injected without exhaust gas emissions moving into unacceptable ranges. Particularly diesel engines with exhaust gas turbochargers, which have smaller stroke volumes, have the disadvantage that the time interval, the so-termed T90 time, until the engine can, from an unloaded condition, deliver 90% of its maximum torque, lasts too long for use particularly in a working machine such as a wheel loader. Particularly when power-branched transmissions are used, which have a mechanical power branch and a continuously variable power branch, in particular a hydrostatic power branch or an electrical power branch, these diesel engines with exhaust gas turbochargers and a smaller stroke volume are increasingly often used.

According to the invention, the invention improves the dynamic torque build-up of the internal combustion engine.

In mobile vehicles the current engine torque is conveyed on the CAN bus. When a load change is demanded, for example by the gas or accelerator pedal or by some other consumer, the engine torque jumps to the value of the suction curve which is in the range of 55% to 65% of the static torque at this current rotational speed. During this a rotational speed increase can also be called for but it is also possible for the rotational speed required to remain the same. Thus, it is possible that the engine should run up or should maintain the current rotational speed. The combustion engine can only deliver a higher torque when the turbocharger has come up to power.

If now the currently available torque from the engine is lower than the torque demanded by the consumers, the rotational speed of the combustion engine will fall.

The time taken for the torque to be built up by the engine is the so-termed T90 time, namely the time until 90% of the static torque has been reached.

Thus, the control parameter for assistance by the additional motor, also known as the hybrid motor, is the target rotational speed of the diesel engine. If the target value or the target value course is not reached, then the additional motor should provide support.

According to the invention the drive-train has an additional motor which always delivers its power to the drive-train when the combustion engine is required to deliver a higher power but the exhaust gas turbocharger needs time to power up and the necessary charging pressure of the exhaust gas turbocharger is not yet available. Since in such a situation the additional motor delivers its power to the drive-train, this delay can be reduced and for the driver the vehicle feels considerably more dynamic. Particularly in the case of working machines such as wheel loaders, besides drive input for propulsion, the working hydraulic system also demands torque from the combustion engine, so that during the course of a working cycle the torque demand from the combustion engine fluctuates very substantially. Thanks to the use of the additional motor this torque demand can be satisfied for the purpose of improving the dynamic behavior.

Preferably, a hydraulic motor is used as the additional motor, which can be used as a motor or as a pump and the stroke volume of which is preferably adjustable. This hydraulic motor co-operates with a hydraulic reservoir device, whereby large amounts of power can be stored and recovered quickly. The reservoir device can be designed as a high-pressure reservoir and the additional motor can be operated as a hydraulic motor in the open circuit. However, the reservoir device can also be made with a high-pressure reservoir and a low-pressure reservoir and the additional motor can be operated as a hydraulic motor in the closed circuit.

But the additional motor can also be in the form of an electric motor that can be operated as a motor and a generator. For this, the electric motor co-operates with an electric storage device.

To store the energy in the reservoir, when the drive-train is used in a working machine such as a wheel loader or an agricultural machine the energy when the vehicle is braked before a reversing process is used. Particularly in the case of wheel loaders, reversing processes are divided into two phases, such that a first phase takes place above a predefined speed level and a second phase below this predefined speed level down to zero speed. In the first phase the vehicle brakes down to the predefined speed without actuating the reversing clutches and in the second phase the vehicle is braked by means of the slipping reversing clutches and then accelerated again. Charging the reservoir device by means of the additional motor takes place during the first phase, namely the braking phase without actuation of the reversing clutches.

In a further embodiment of the invention the additional motor is functionally connected to the internal combustion engine. Preferably, between the additional motor and the combustion engine there is arranged a step-down gearset which transforms the rotational speed of the combustion engine to the fast range so that the additional motor has a higher rotational speed than the combustion engine. This makes it possible to have a smaller additional motor.

In a further embodiment of the invention, the reservoir device is supplied with energy in that the additional motor supplies the reservoir device with energy when the vehicle is in traction operation and the internal combustion engine is operating close to its optimum consumption condition and at that operating point the combustion engine also has some torque in reserve.

To control the switching on of the additional motor, the drive-train has a control unit which recognizes the conditions for the higher torque demand from data of the transmission control unit and the electronic system of the internal combustion engine and, depending on the data, activates the additional motor so that it delivers the necessary supporting torque for the combustion engine. In a further embodiment, in addition to these, data information from the drive input of the working hydraulic system of the vehicle is available, this data too contributing toward the determination of the necessary supporting torque for the combustion engine.

In another embodiment the additional motor is switched on for supporting the diesel engine when the vehicle is in overdrive operation so that the combustion engine is operating above its nominal rotational speed and the injection quantity of the combustion engine is adjusted to zero. This happens mainly with diesel engines in working machines which are rotational-speed-regulated. The control for the additional motor determines the supporting torque delivered by the additional motor so that the combustion engine remains in overdrive operation and no fuel is injected. In this operating condition the necessary supporting torque is provided exclusively by the additional motor.

So that the additional motor can either supply the reservoir device with energy or support the internal combustion engine by delivering power, data from the transmission control unit about the current operating condition, the reversing process, and data from the combustion engine are evaluated and the additional motor is activated accordingly. Since the additional motor always supports the combustion engine when the latter cannot produce the desired torque increase quickly enough, it is possible to use an internal combustion engine designed as a diesel engine with a turbocharger and a small stroke volume, without adverse effect on the dynamics of the vehicle.

BRIEF DESCRIPTION OF THE DRAWINGS

Below, the invention will be explained in further detail with reference to a drawing. The sole FIGURE diagrammatically shows an embodiment of the drive-train according to the invention.

DETAILED DESCRIPTION OF THE PREFERRED EMBODIMENTS

The single FIGURE shows an internal combustion engine 1 which drives a vehicle wheel 3 by way of a power-branching transmission 2. An additional motor 4, designed as a hydraulic motor with an adjustable stroke volume, is functionally connected with the combustion engine 1 by way of a step-down gearset 5. The step-down gearset 5 is designed such that the rotational speed of the additional motor 4 is higher than the rotational speed of the combustion engine 1. The power-branching transmission 2 is built like the transmission defined in DE 102009001602A1.

If an increase of the power demand at the internal combustion engine 1 is detected, which can result for example from a change of the accelerator pedal position or a demand from the working hydraulic system, then the additional motor 4 is switched on in a manner that depends on the change of the power delivered by the combustion engine 1. If the power delivered, in particular the torque of the combustion engine 1 changes only slowly but the power demand on the combustion engine 1 shows a large difference, then the additional motor is switched on in such manner that it delivers a high torque.

INDEXES

1 Internal combustion engine
2 Power-branching transmission
3 Vehicle wheel
4 Additional motor
5 Step-down gearset

The invention claimed is:

1. A drive-train for a mobile vehicle, in which an internal combustion engine with an exhaust gas turbocharger drives at least one vehicle wheel by way of a transmission, the exhaust gas turbocharger injecting a quantity of fuel into the internal combustion engine for increasing power in a power path from the combustion engine to the vehicle wheel only when the exhaust gas turbocharger is operating at full power, and an additional motor whose power can be switched on in the power path from the combustion engine to the vehicle wheel, the power of the additional motor being switchable on and delivered into the power path from the internal combustion engine to the vehicle wheel, when the exhaust gas turbocharger is operating below full power and a rotational speed specification at the combustion engine exceeds an actual rotational speed of the combustion engine, an amount of time for which the additional motor is switched on depends on one of:
  an exhaust gas emission;
  a difference between the actual rotational speed of the combustion engine and a specified rotational speed of the combustion engine; and
  a variation of torque of the combustion engine.

2. The drive-train according to claim 1, wherein the transmission is a power-branching transmission with a mechanical power branch and a continuously variable power branch.

3. The drive-train according to claim 1, wherein the additional motor is a hydraulic motor that is operable as a pump.

4. The drive-train according to claim 1, wherein the additional motor is an electric motor which is operatable as a generator.

5. The drive-train according to claim 1, wherein the additional motor is connected, either directly or by way of a transmission gear ratio, to a drive output shaft of the internal combustion engine, and the transmission gear ratio is designed such that a rotational speed of the additional motor is higher than the actual rotational speed of the combustion engine.

6. The drive-train according to claim 1, wherein the additional motor is a hydraulic motor which is operable in either an open hydraulic circuit with a first pressure reservoir, or in a closed hydraulic circuit with the first pressure reservoir and a second pressure reservoir, the first pressure reservoir being a high-pressure reservoir and the second pressure reservoir being a low-pressure reservoir.

7. The drive-train according to claim 1, wherein the drive-train is utilized in a wheel loader.

\* \* \* \* \*